(12) United States Patent
Oishi et al.

(10) Patent No.: US 11,788,546 B2
(45) Date of Patent: Oct. 17, 2023

(54) AMMONIA PLANT SYNTHESIS GAS COMPRESSOR TRAIN

(71) Applicant: MITSUBISHI HEAVY INDUSTRIES COMPRESSOR CORPORATION, Tokyo (JP)

(72) Inventors: Yusuke Oishi, Hiroshima (JP); Hiroaki Oka, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 170 days.

(21) Appl. No.: 17/082,752

(22) Filed: Oct. 28, 2020

(65) Prior Publication Data
US 2021/0131444 A1 May 6, 2021

(30) Foreign Application Priority Data

Nov. 1, 2019 (JP) .................................. 2019-199863

(51) Int. Cl.
*F04D 29/32* (2006.01)
*F04D 29/041* (2006.01)
(Continued)

(52) U.S. Cl.
CPC .......... *F04D 29/321* (2013.01); *C01C 1/0417* (2013.01); *F04D 29/041* (2013.01); *F04D 29/053* (2013.01); *F04D 29/403* (2013.01)

(58) Field of Classification Search
CPC .... F04D 17/122; F04D 25/045; F04D 29/023; F04D 29/041; F04D 29/053; F04D 29/284; F04D 29/321; F04D 29/403
(Continued)

(56) References Cited

U.S. PATENT DOCUMENTS 3,051,090 A * 8/1962 Zumbusch .............. F04D 1/063
415/214.1
3,229,642 A * 1/1966 Lobanoff ................ F04D 1/063
415/199.2
(Continued)

FOREIGN PATENT DOCUMENTS

JP 2000-038988 A 2/2000
JP 2000-154020 A 6/2000
(Continued)

OTHER PUBLICATIONS

ASME; Designation: E140—12b: Standard Hardness Conversion Tables for Metals Relationship Among Brinell Hardness, Vickers Hardness, Rockwell Hardness, Superficial Hardness, Knoop (Year: 2012).*
(Continued)

*Primary Examiner* — Kenneth J Hansen
*Assistant Examiner* — Benjamin Doyle
(74) *Attorney, Agent, or Firm* — Osha Bergman Watanabe & Burton LLP (57) ABSTRACT

An ammonia plant synthesis gas compressor train includes a steam turbine; and a compression unit that compresses a synthesis gas by being rotationally driven by the steam turbine. The compression unit includes a rotary shaft that rotates around an axis, and a plurality of impellers that are provided on the rotary shaft at intervals in a direction of the axis and are rotated integrally with the rotary shaft to pump a gas outward in a radial direction to compress the gas. In at least one of the impellers, a maximum operating peripheral speed at a radially outermost position of the impeller is within a range of 290 m/s to 390 m/s, a yield strength is 827 MPa or less, and a Brinell hardness is 311 or less.

2 Claims, 5 Drawing Sheets

(51) Int. Cl.
*F04D 29/053* (2006.01)
*F04D 29/40* (2006.01)
*C01C 1/04* (2006.01)

(58) Field of Classification Search
USPC .......................................................... 417/405
See application file for complete search history.

(56) References Cited

U.S. PATENT DOCUMENTS

| | | | | |
|---|---|---|---|---|
| 3,733,145 | A * | 5/1973 | Kaplansky | ............ F04D 29/056 |
| | | | | 415/199.1 |
| 3,976,395 | A * | 8/1976 | Kalnin | .................. F04D 17/125 |
| | | | | 415/230 |
| 5,971,702 | A * | 10/1999 | Afton | .................... F01D 25/285 |
| | | | | 29/888.011 |
| 2010/0316502 | A1 * | 12/2010 | Khanhson | ........... F04D 29/2222 |
| | | | | 29/889.21 |
| 2011/0277629 | A1 * | 11/2011 | Manning | ............. F04D 27/0261 |
| | | | | 96/113 |
| 2013/0061613 | A1 | 3/2013 | Rached | |
| 2014/0178183 | A1 * | 6/2014 | Masuda | ................ F04D 29/624 |
| | | | | 415/173.1 |
| 2016/0040687 | A1 | 2/2016 | Yagi et al. | |
| 2016/0123149 | A1 * | 5/2016 | Kishi | .................. F16H 57/0471 |
| | | | | 415/122.1 |
| 2017/0022838 | A1 * | 1/2017 | Kuwamura | ............. F01D 5/225 |
| 2017/0218963 | A1 * | 8/2017 | Kobayashi | ............... F04D 25/16 |
| 2018/0002812 | A1 | 1/2018 | Watanabe et al. | |
| 2018/0209728 | A1 | 7/2018 | Iurisci et al. | |
| 2019/0201972 | A1 | 7/2019 | Cappuccini et al. | |
| 2019/0210885 | A1 * | 7/2019 | Fiori | ..................... C01C 1/0417 |

FOREIGN PATENT DOCUMENTS

| | | |
|---|---|---|
| JP | 2005-307943 A | 11/2005 |
| JP | 2013-521368 A | 6/2013 |
| JP | 2015-108301 A | 6/2015 |
| JP | 2015-163793 A | 9/2015 |
| JP | 2019-523822 A | 8/2019 |
| WO | 2014-120286 A1 | 8/2014 |

OTHER PUBLICATIONS

American Petroleum Institute (API), Axial and Centrifugal Compressors and Expander-compressors API Standard 617Eighth Edition, Sep. 2014 (Year: 2014).*

* cited by examiner

AMMONIA PLANT SYNTHESIS GAS COMPRESSOR TRAIN

BACKGROUND OF THE INVENTION

Field of the Invention

The present disclosure relates to an ammonia plant synthesis gas compressor train.

Priority is claimed on Japanese Patent Application No. 2019-199863, filed on Nov. 1, 2019, the contents of which are incorporated herein by reference.

Description of Related Art

For example, Japanese Unexamined Patent Application, First Publication No. 2000-154020 discloses an ammonia producing compressor system to be used in an ammonia plant that produces ammonia. This ammonia producing compressor system includes a low-pressure side compressor, a high-pressure side compressor, and a driving machine for driving these compressors.

SUMMARY OF THE INVENTION

In order to improve the performance of the compressors as described above, it is necessary to increase the rotational speed of each compressor. When the rotational speed of the compressor is increased, the peripheral speed of an impeller that compresses the gas in the compressor casing increases. The stresses acting on the impeller increases as the peripheral speed of the impeller increases. For this reason, it is necessary to increase the yield strength and hardness of the impeller so that the impeller can withstand an increase in stress. However, the gas handled in the ammonia plant is a gas containing a large amount of hydrogen. In a compressor that compresses the gas containing a large amount of hydrogen, when the yield strength and hardness of the impeller are increased, the impeller may be cracked due to hydrogen embrittlement.

The present disclosure provides an ammonia plant synthesis gas compressor train capable of suppressing hydrogen embrittlement that occurs in an impeller while increasing the rotational speed of the impeller.

In order to solve the above problems, an ammonia plant synthesis gas compressor train according to the present disclosure includes a steam turbine; and a compression unit that is configured to compress a synthesis gas containing hydrogen by being rotationally driven by the steam turbine. The compression unit includes a rotary shaft that is configured to around an axis, and a plurality of impellers that are disposed on the rotary shaft at intervals in a direction of the axis and are configured to rotate integrally with the rotary shaft to pump a gas outward in a radial direction to compress the gas. In at least one of the plurality of impellers, a maximum operating peripheral speed at a radially outermost position of each of the plurality of impellers is within a range of 290 m/s to 390 m/s, a yield strength is 827 MPa or less, and a Brinell hardness is 311 or less.

According to the ammonia plant synthesis gas compressor train of the present disclosure, it is possible to suppress the hydrogen embrittlement that occurs in the impeller while increasing the rotational speeds of the impeller.

DETAILED DESCRIPTION OF THE INVENTION

Hereinafter, embodiments for carrying out an ammonia plant synthesis gas compressor train according to the present disclosure will be described with reference to the accompanying drawings. However, the present disclosure is not limited to the embodiment only.

(Configuration of Ammonia Plant Synthesis Gas Compressor Train)

Figure 1:
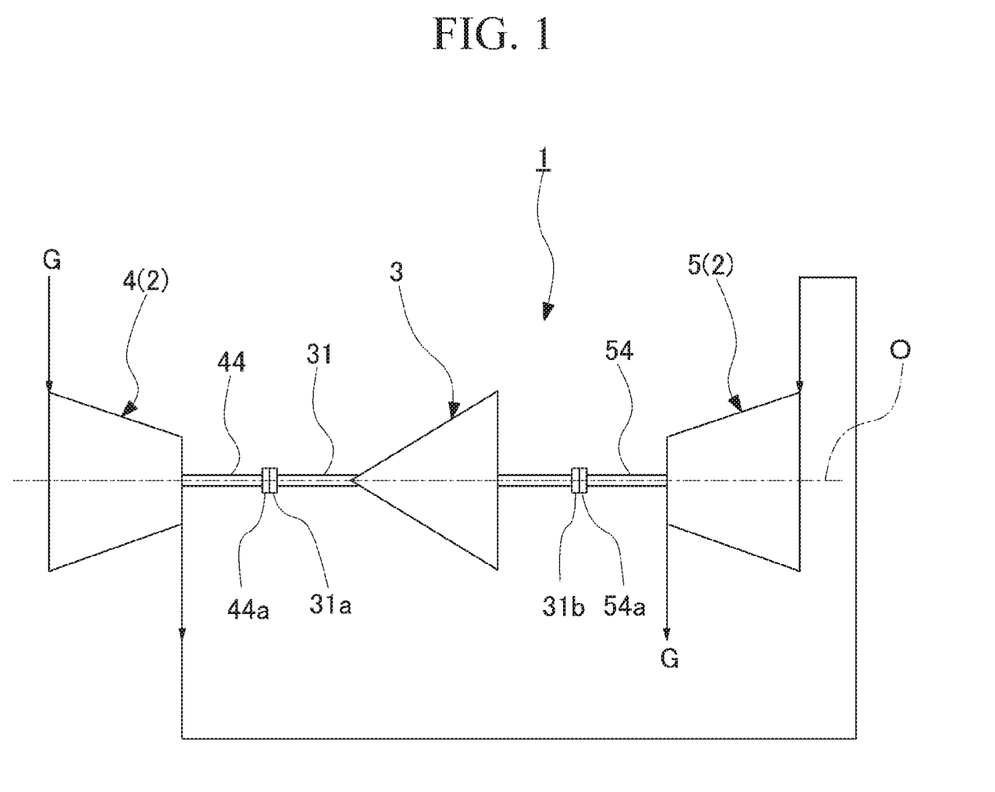
FIG. 1 is a schematic diagram illustrating a configuration of an ammonia plant synthesis gas compressor train according to an embodiment of the present disclosure.

Hereinafter, the ammonia plant synthesis gas compressor train according to the embodiment of the present disclosure will be described with reference to FIGS. 1 to 5. As illustrated in FIG. 1, the ammonia plant synthesis gas compressor train 1 includes a compression unit 2 and a steam turbine 3.

The compression unit 2 compresses a synthesis gas G to be used in the process of purifying ammonia in an ammonia plant. The compression unit 2 is rotationally driven by the steam turbine 3. The synthesis gas G is a gas containing hydrogen. In the present embodiment, the compression unit 2 includes a low-pressure stage compressor 4 and a high-pressure stage compressor 5. In the ammonia plant synthesis gas compressor train 1, the low-pressure stage compressor 4 and the high-pressure stage compressor 5 that constitute the compression unit 2, and the steam turbine 3 are disposed in series in the direction of an axis O in which a turbine shaft 31 of the steam turbine 3 extends.

(Configuration of Steam Turbine)

Figure 2:
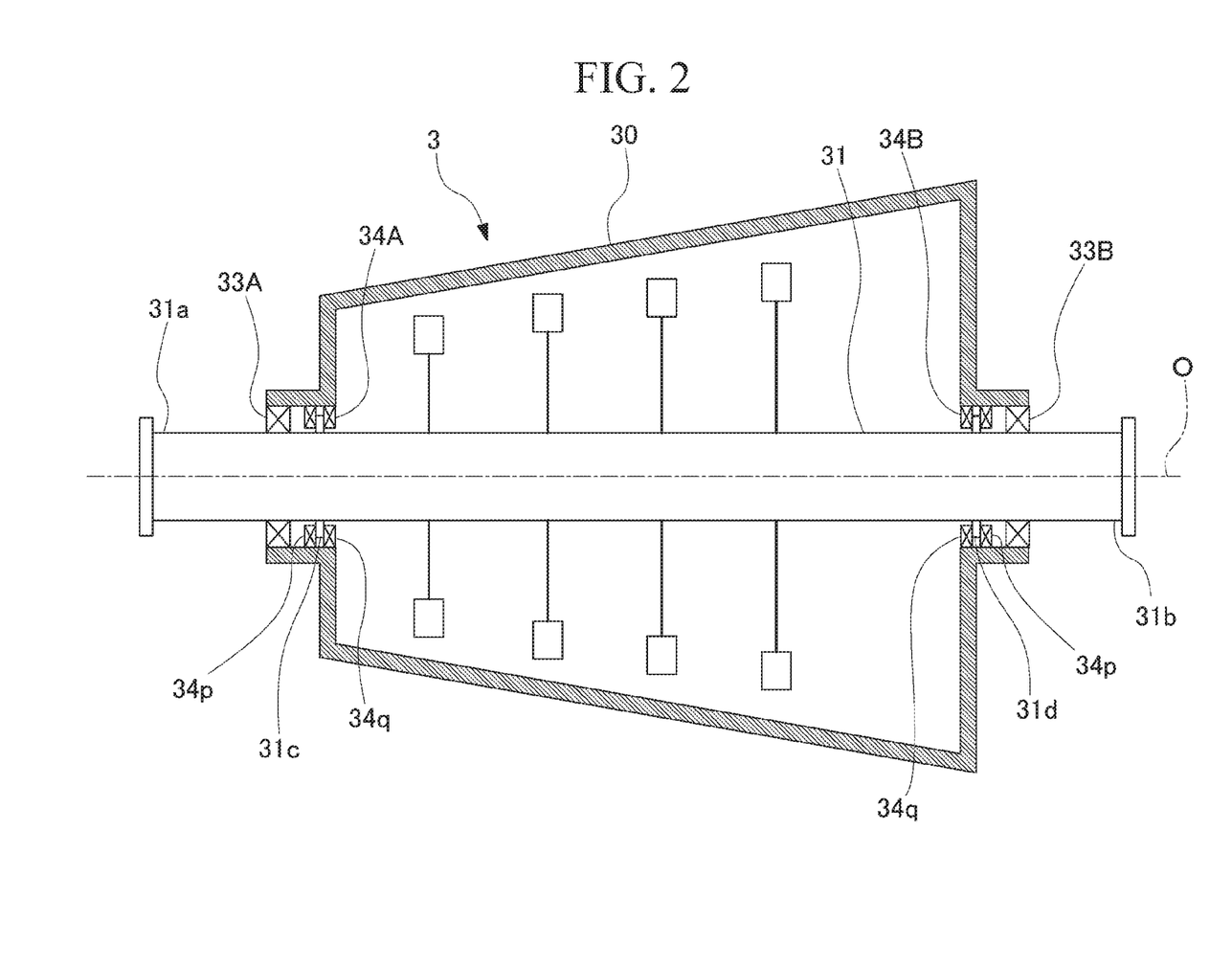
FIG. 2 is a sectional view illustrating a schematic configuration of a steam turbine that constitutes the ammonia plant synthesis gas compressor train.

The steam turbine 3 is disposed between the low-pressure stage compressor 4 and the high-pressure stage compressor 5 in the direction of an axis O. The steam turbine 3 includes a turbine shaft 31 that is rotationally driven around the axis O by steam. The steam turbine 3 rotationally drives the low-pressure stage compressor 4 and the high-pressure stage compressor 5 by the rotational force of the turbine shaft 31. As illustrated in FIG. 2, the steam turbine 3 mainly includes a tubular turbine casing 30 extending in the direction of the axis O, a turbine shaft 31 housed in the turbine casing 30, a pair of journal bearings 33A and 33B, and a pair of thrust bearings 34A and 34B.

The turbine shaft 31 extends in the direction of the axis O and is disposed to be rotatable around the axis O with respect to the turbine casing 30. The turbine shaft 31 has one end 31a in the direction of the axis O and the other end 31b protruding to the outside of the turbine casing 30.

The pair of journal bearings 33A and 33B is disposed so as to support the vicinity of both ends of the turbine casing 30 in the direction of the axis O. The pair of journal bearings 33A and 33B respectively supports the turbine shaft 31 to be rotatable around the axis O. The pair of journal bearings 33A and 33B supports the end of the turbine shaft 31 in the direction of the axis O in the turbine casing 30.

The pair of thrust bearings 34A and 34B is disposed so as to support the vicinity of both ends of the turbine shaft 31 in the direction of the axis O. The thrust bearings 34A and 34B have bearing pads 34p and 34q facing each other at intervals in the direction of the axis O, respectively. The thrust bearing 34A supports a disk-shaped thrust collar 31c provided on the turbine shaft 31 between the bearing pads 34p and 34q. The thrust bearing 34A restricts the movement of the thrust collar 31c in the direction of the axis O by the bearing pads 34p and 34q. Similarly, in the thrust bearing 34B, a thrust collar 31d is disposed between bearing pads 34p and 34q. The thrust bearing 34B restricts the movement of the thrust collar 31d in the direction of the axis O. Accordingly, the pair of thrust bearings 34A and 34B support both ends of the turbine shaft 31 from the direction of the axis O.

In the present embodiment, the pair of thrust bearings 34A and 34B is disposed between the pair of journal bearings 33A and 33B in the direction of the axis O. In other words, the pair of thrust bearings 34A and 34B is disposed inside the pair of journal bearings 33A and 33B in the direction of the axis O respectively. Accordingly, the thrust collars 31c and 31d of the turbine shaft 31 are also disposed between the pair of journal bearings 33A and 33B.

(Configuration of Low-Pressure Stage Compressor)

Figure 3:
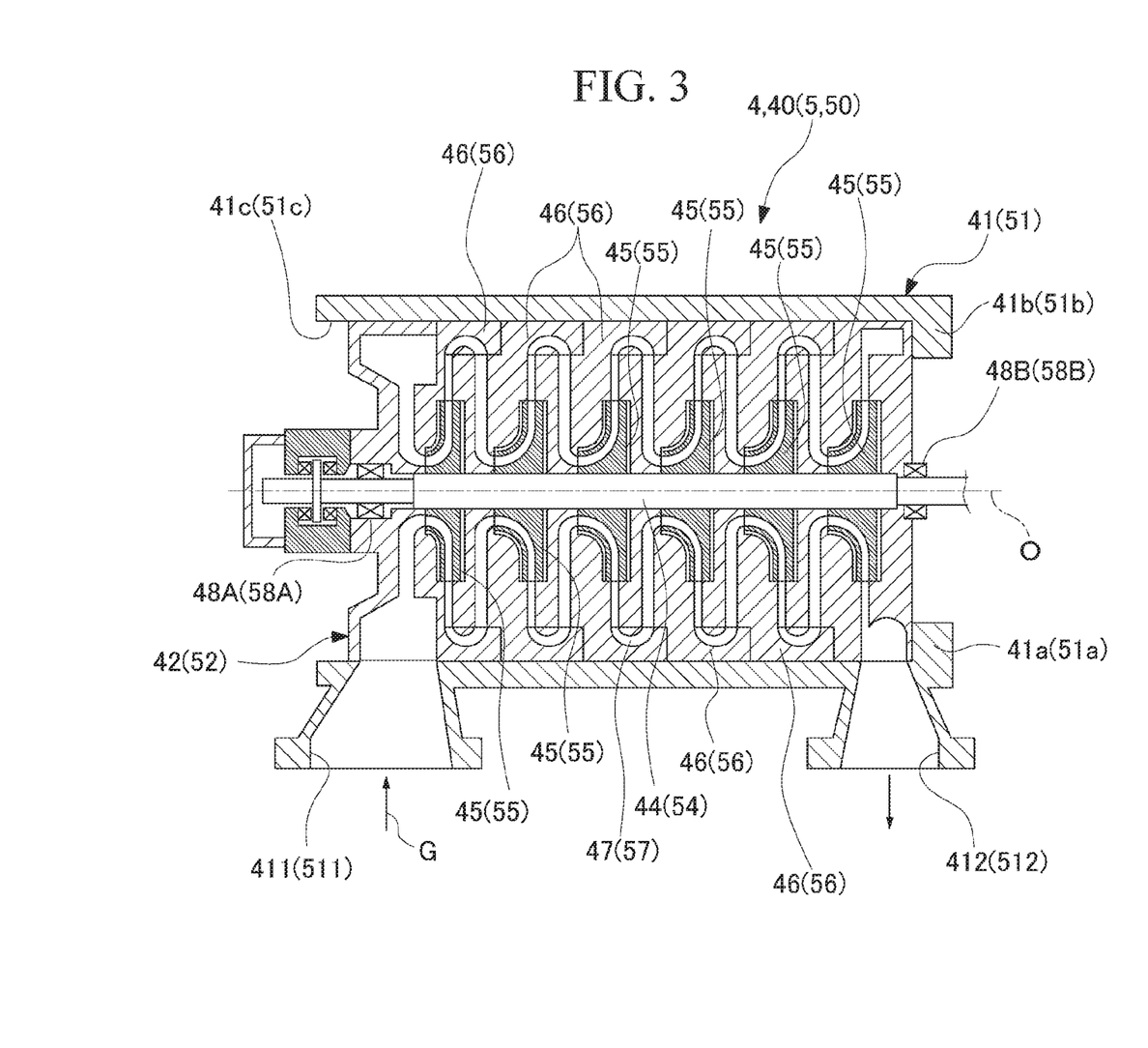
FIG. 3 is a sectional view illustrating a configuration of a low-pressure stage compressor (and a high-pressure stage compressor) that constitute the ammonia plant synthesis gas compressor train.

The low-pressure stage compressor 4 compresses the synthesis gas G before being introduced into the high-pressure stage compressor 5. As illustrated in FIG. 3, the low-pressure stage compressor 4 has a compressor casing 41 and a bundle 42. The low-pressure stage compressor 4 constitutes a low-pressure stage compression unit 40 as one of the compression unit 2.

The compressor casing 41 has a tubular shape that extends in the direction of the axis O. The compressor casing 41 is dividable into two upper and lower parts. The compressor casing 41 includes a lower casing 41a and an upper casing 41b. The lower casing 41a and the upper casing 41b have a semi-tubular shape obtained by dividing the compressor casing 41 into two parts on a horizontal plane. An opening 41c is formed in at least one end of the compressor casing 41 in the direction of the axis O. In the present embodiment, the opening 41c is formed at the end farthest from the steam turbine 3 in the low-pressure stage compressor 4. An introduction port 411 for introducing the synthesis gas G into the compressor casing 41 is formed at one end of the compressor casing 41 in the direction of the axis O. A discharge port 412 that discharges the synthesis gas G compressed in the compressor casing 41 is formed at the other end of the compressor casing 41 in the direction of the axis O.

The bundle 42 is housed in the compressor casing 41. The bundle 42 includes a rotary shaft 44, a plurality of impellers 45, and a plurality of partition plates 46. The bundle 42 is attachable to and detachable from the compressor casing 41 through the opening 41c in the direction of the axis O in a state where the rotary shaft 44 and the impellers 45 are held by the plurality of partition plates 46.

The rotary shaft 44 extends in the direction of the axis O. The rotary shaft 44 is housed in the plurality of partition plates 46 together with the plurality of impellers 45. The rotary shaft 44 is provided to be rotatable around the axis O by bearing parts 48A and 48B provided in the compressor casing 41. At least one end 44a of the rotary shaft 44 protrudes outward in the direction of the axis O from the compressor casing 41. As illustrated in FIG. 1, one end 31a of the turbine shaft 31 of the steam turbine 3 is coupled to the end 44a of the rotary shaft 44. Accordingly, the rotational force of the turbine shaft 31 of the steam turbine 3 is transmitted to the rotary shaft 44, and the rotary shaft 44 is rotationally driven around the axis O.

Figure 4:
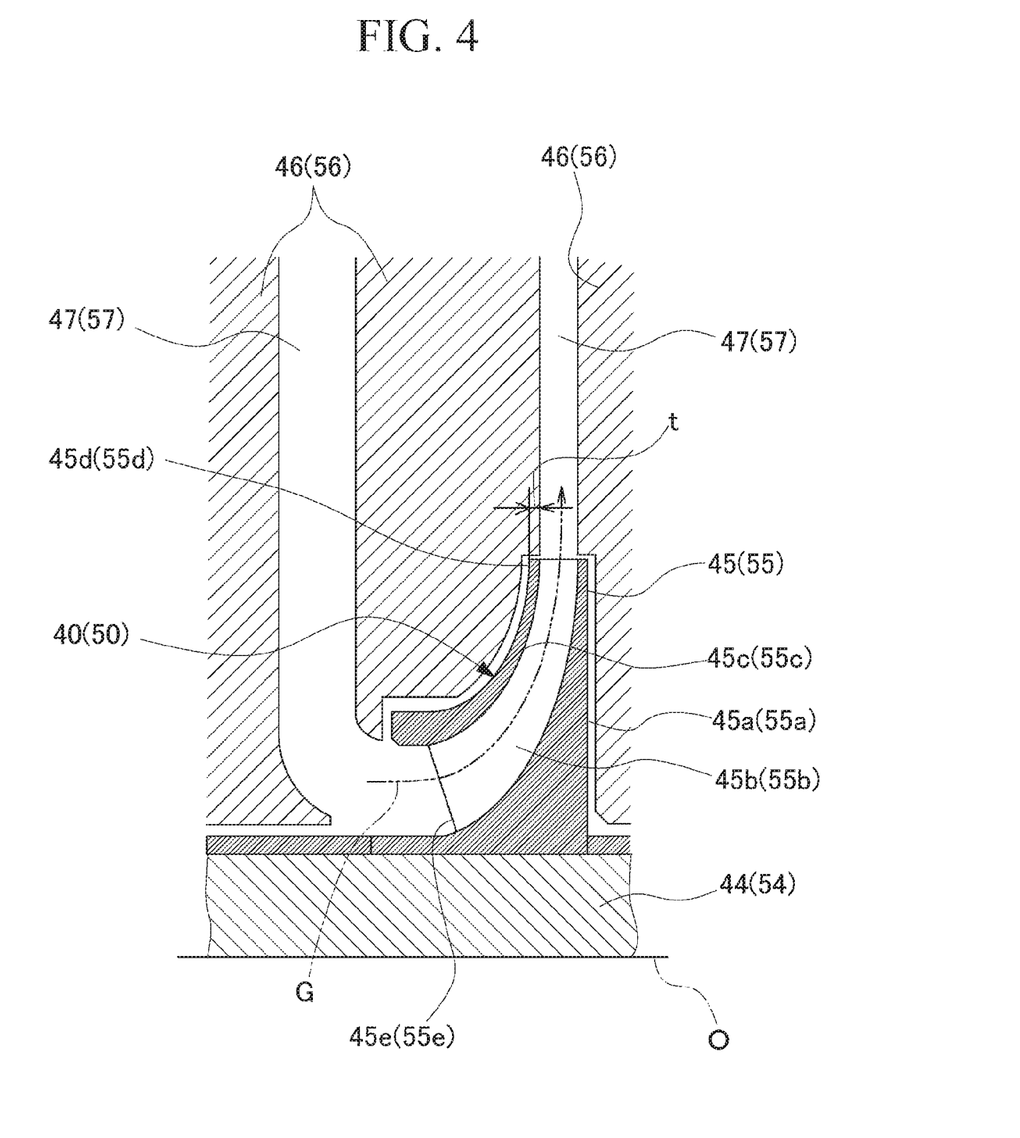
FIG. 4 is a sectional view illustrating a schematic configuration of an impeller of the low-pressure stage compressor (high-pressure stage compressor).

As illustrated in FIG. 3, the plurality of impellers 45 are fixed to the rotary shaft 44 at intervals in the direction of the axis O. Each impeller 45 rotates around the axis O integrally with the rotary shaft 44. As illustrated in FIG. 4, the impeller 45 includes a disk-shaped disk 45a, a plurality of blades 45b provided on one side of the disk 45a in the direction of the axis O, and a cover 45c provided so as to cover the plurality of blades 45b. The plurality of blades 45b are provided at intervals in the circumferential direction around the axis O. By rotating around the axis O, the impeller 45 pumps the synthesis gas G, which has flowed in from one side in the direction of the axis O outward in the radial direction while swirling the synthesis gas G around the axis O by the plurality of blades 45b.

As illustrated in FIG. 3, a plurality of partition plates 46 are disposed side by side in the direction of the axis O in the compressor casing 41. The partition plate 46 has a disk shape. The plurality of partition plates 46 are fixed to each other in the direction of the axis O so as to be integrated. The plurality of partition plates 46 hold the rotary shaft 44 and the plurality of impellers 45 in a rotatable state.

A gas flow channel 47 in which radially outward expansion and radially inward reduction are alternately repeated in the direction of the axis O formed in the compressor casing 41 by the plurality of impellers 45 and the plurality of partition plates 46. The synthesis gas G is sequentially compressed by passing through the plurality of (stage) impellers 45 provided in the gas flow channel 47 while flowing through the gas flow channel 47 from one side to the other side in the direction of the axis O.

Figure 5:
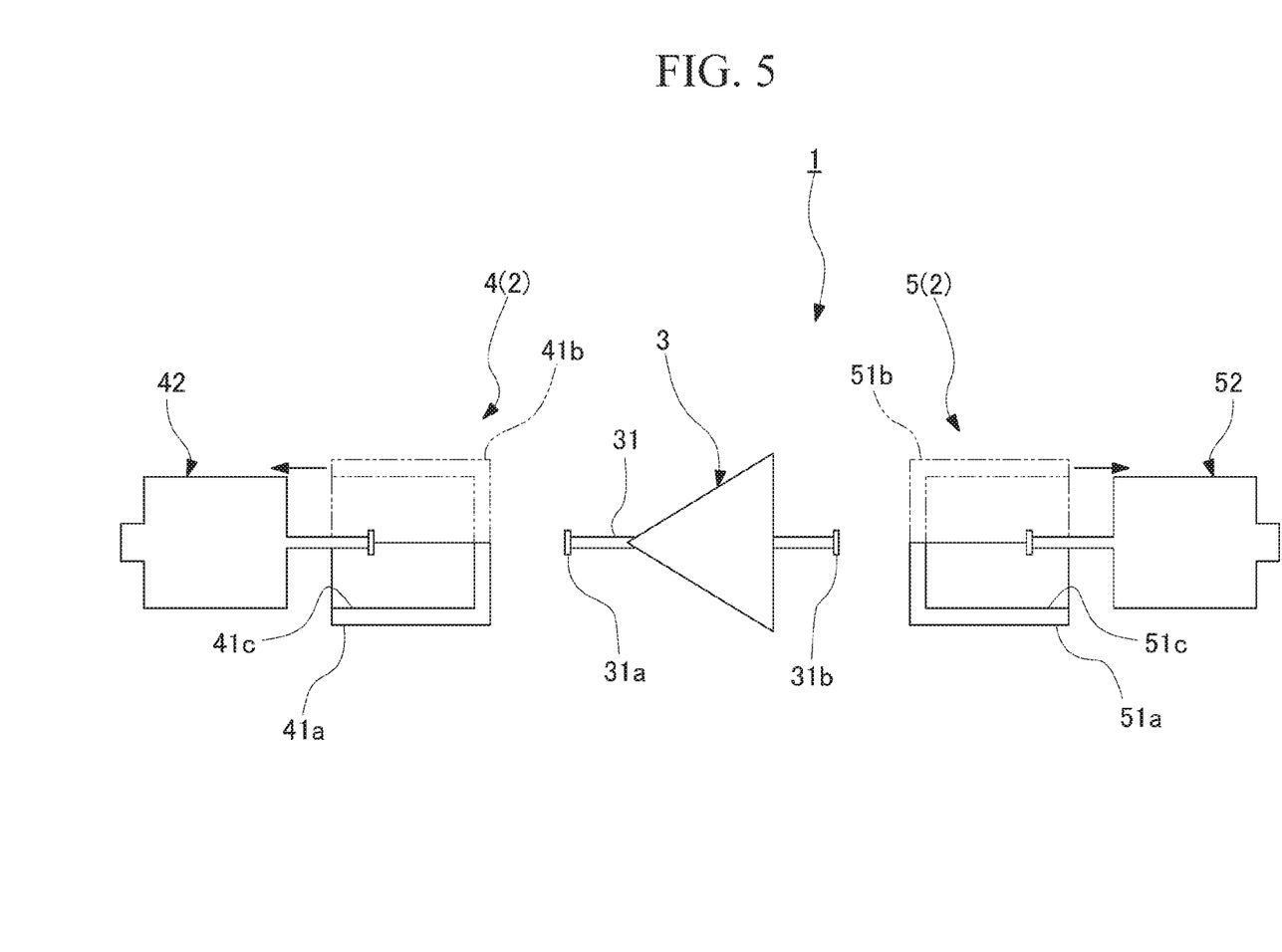
FIG. 5 is a schematic diagram illustrating a state in which a bundle is taken out from the low-pressure stage compressor and the high-pressure stage compressor.

As illustrated in FIG. 5, in the low-pressure stage compressor 4, the bundle 42 is moved in the direction of the axis O so as to separate from the steam turbine 3 with respect to the lower casing 41a in a state in which the upper casing 41b is removed from the lower casing 41a. Accordingly, the bundle 42 can be separated from the compressor casing 41.

(Configuration of High-Pressure Stage Compressor)

The high-pressure stage compressor 5 further compresses the synthesis gas G compressed by the low-pressure stage compressor 4. The high-pressure stage compressor 5 of the present embodiment is disposed so as to face the opposite side of the low-pressure stage compressor 4 in the direction of the axis O with respect to the steam turbine 3. The high-pressure stage compressor 5 has the same structure as the low-pressure stage compressor 4. Specifically, as illustrated in FIG. 3, the high-pressure stage compressor 5 has a compressor casing 51 and a bundle 52. The high-pressure stage compressor 5 constitutes a high-pressure stage compression unit 50 as one of the compression unit.

The compressor casing 51 has a tubular shape that extends in the direction of the axis O. The compressor casing 51 is dividable into two upper and lower parts. The compressor casing 51 includes a lower casing 51a and an upper casing 51b. The lower casing 51a and the upper casing 51b have a semi-tubular shape obtained by dividing the compressor casing 51 into two parts on a horizontal plane. An opening 51c is formed in at least one end of the compressor casing 51 in the direction of the axis O. In the present embodiment, the opening 51c is formed at the end farthest from the steam turbine 3 in the high-pressure stage compressor 5. That is, the opening 51c is formed opposite to the opening 41c of the low-pressure stage compressor 4 in the direction of the axis O. An introduction port 511 for introducing the synthesis gas G compressed by the low-pressure stage compressor 4 is formed at the other end of the compressor casing 51 in the direction of the axis O in the compressor casing 51. A discharge port 512 for discharging the synthesis gas G compressed in the compressor casing 51 is formed at one end of the compressor casing 51 in the direction of the axis O.

The bundle 52 is housed in the compressor casing 51. The bundle 52 includes a rotary shaft 54, a plurality of impellers 55, and a plurality of partition plates 56. The bundle 52 is attachable to and detachable from the compressor casing 51 through the opening 51c in the direction of the axis O in a state in which the rotary shaft 54 and the impellers 55 are held by the plurality of partition plates 56.

The rotary shaft 54 extends in the direction of the axis O. The rotary shaft 54 is housed in the plurality of partition plates 56 together with the plurality of impellers 55. The rotary shaft 54 is provided to be rotatable around the axis O by bearing parts 58A and 58B provided on the compressor casing 51. At least one end 54a of the rotary shaft 54 protrudes outward from the compressor casing 51 in the direction of the axis O. As illustrated in FIG. 1, the other end 31b of the turbine shaft 31 of the steam turbine 3 is coupled to the end 54a of the rotary shaft 54. Accordingly, the rotational force of the turbine shaft 31 of the steam turbine 3 is transmitted to the rotary shaft 54, and the rotary shaft 54 is rotationally driven around the axis O.

As illustrated in FIG. 3, the plurality of impellers 55 are fixed to the rotary shaft 54 at intervals in the direction of the axis O. Each impeller 55 rotates around the axis O integrally with the rotary shaft 54. As illustrated in FIG. 4, the impeller 55 includes a disk-shaped disk 55a, a plurality of blades 55b provided on the other side of the disk 55a in the direction of the axis O, and a cover 55c provided so as to cover the plurality of blades 55b. The plurality of blades 55b are provided at intervals in the circumferential direction around the axis O. By rotating around the axis O, the impeller 55 pumps the synthesis gas G, which has flowed in from the other side in the direction of the axis O, outward in the radial direction while swirling the synthesis gas G around the axis O by the plurality of blades 55b.

As illustrated in FIG. 3, a plurality of partition plates 56 are disposed side by side in the direction of the axis O in the compressor casing 51. The partition plate 56 has a disk shape. The plurality of partition plates 56 are fixed to each other in the direction of the axis O so as to be integrated. The plurality of partition plates 56 hold the rotary shaft 54 and the plurality of impellers 55 in a rotatable state.

A gas flow channel 57 in which radially outward expansion and radially inward reduction are alternately repeated in the direction of the axis O formed in the compressor casing 51 by the plurality of impellers 55 and the plurality of partition plates 56. The synthesis gas G is sequentially compressed by passing through the plurality of (stage) impellers 55 provided in the gas flow channel 57 while flowing through the gas flow channel 57 to one side from the other side in the direction of the axis O.

As illustrated in FIG. 5, in the high-pressure stage compressor 5, the bundle 52 is moved in the direction of the axis O so as to be separated from the steam turbine 3 and the low-pressure stage compressor 4 with respect to the lower casing 51a in a state in which the upper casing 51b is removed from the lower casing 51a. Accordingly, the bundle 52 can be separated from the compressor casing 51.

(Configuration of Impeller)

In a compressor that handles a gas containing a large amount of hydrogen (synthesis gas G), using a material having a yield strength exceeding 827 MPa or a Rockwell hardness exceeding C34 is prohibited in Standard 4.5.1.11 of American Petroleum Institute (API). Here, the gas containing a large amount of hydrogen is specifically a gas in which the partial pressure of hydrogen exceeds 689 kPa or the hydrogen concentration at any pressure exceeds 90 mol %.

In contrast, the ammonia plant synthesis gas compressor train 1 in the present embodiment compresses the synthesis gas G containing a large amount of hydrogen. Additionally, in the low-pressure stage compressor 4 and the high-pressure stage compressor 5, the maximum rotational speed of the rotary shafts 44 and 54 is within a range of 12,000 rpm to 16,000 rpm.

In such an ammonia plant synthesis gas compressor train 1, in the low-pressure stage compressor 4 and the high-pressure stage compressor 5, which are the compression unit, the impellers 45 and 55 satisfy all of the following conditions 1 to 3.

(Condition 1)

The maximum operating peripheral speed of the impellers 45 and 55 at the radially outermost position is within a range of 290 m/s to 390 m/s.

(Condition 2)

The impellers 45 and 55 have a yield strength of 827 MPa or less.

(Condition 3)

The impellers 45 and 55 have a Brinell hardness (HB) of 311 or less.

As a material for forming the impellers 45 and 55, it is preferable to adopt a steel material such as nickel-chromium-molybdenum steel (SNCM) that satisfies the numerical values of the above Conditions 2 and 3.

In addition, at least one of the plurality of impellers 45 of the low-pressure stage compressor 4 and the plurality of impellers 55 of the high-pressure stage compressor 5 may satisfy all of the above Conditions 1 to 3. For example, Conditions 2 and 3 may be satisfied only in the impellers 45 and 55 in which the outer diameters of the disks 45a and 55a are large and the maximum operating peripheral speed at the radially outermost position satisfies the above Condition 1.

Additionally, since the impellers 45 and 55 suppress the pole stress that acts when compressing the synthesis gas G, for example, as illustrated in FIG. 5, it is preferable to increase the wall thickness t of the radially outer ends 45d and 55d in the covers 45c and 55c. Additionally, for example, (the curvature R) of fillets of leading edges 45e and 55e of the blades 45b and 55b may be increased.

(Effects)

In the ammonia plant synthesis gas compressor train 1 having the above configuration, at least one impeller 45 or 55 provided in the low-pressure stage compressor 4 and the high-pressure stage compressor 5 as the compression unit at the radially outermost position of the impellers 45 and 55 has a yield strength of 827 MPa or less, a maximum operating peripheral speed of 290 to 390 m/s, and a Brinell hardness (HB) of 311 or less. By setting the maximum operating peripheral speeds of the impellers 45 and 55 to 290 to 390 m/s, the rotational speeds of the low-pressure stage compressor 4 and the high-pressure stage compressor 5 can be increased, and higher performances of the low-pressure stage compressor 4 and the high-pressure stage compressor 5 can be achieved. When the peripheral speeds of the impellers 45 and 55 are increased, the stresses acting on the impellers 45 and 55 are increased, which may be 700 MPa or more, for example. For that reason, it is necessary to increase the yield strengths and hardnesses of the impellers 45 and 55. Thus, in the present embodiment, the impellers 45 and 55 have a yield strength of 827 MPa or less and a hardness of 311 or less. For that reason, hydrogen embrittlement of the impellers 45 and 55 can be suppressed while ensuring the strengths of the impellers 45 and 55. Therefore, it is possible to suppress the hydrogen embrittlement that occurs in the impellers 45 and 55 while increasing the rotational speeds of the impellers 45 and 55.

Additionally, by setting the maximum rotational speeds of the low-pressure stage compressor 4 and the high-pressure stage compressor 5 that compress the synthesis gas G to a high rotational speed of 12,000 to 16,000 rpm, higher performances of the low-pressure stage compressor 4 and the high-pressure stage compressor 5 are can be achieved. Moreover, since the low-pressure stage compressor 4 and the high-pressure stage compressor 5 are provided as the compression unit, it is possible to obtain the ammonia plant synthesis gas compressor train 1 capable of performing compression in two stages with high efficiency.

Additionally, the low-pressure stage compressor 4 and the high-pressure stage compressor 5 respectively include the bundles 42 and 52 that are detachably housed in compressor casings 41 and 51 that are dividable into upper and lower parts. That is, the low-pressure stage compressor 4 and the high-pressure stage compressor 5 are bundle-type centrifugal compressors. Therefore, the pressures in the gas flow channels 47 and 57 can be kept high. For that reason, the discharge pressures of the synthesis gas G from the low-pressure stage compressor 4 and the high-pressure stage compressor 5 can be set high.

Moreover, the steam turbine 3 is disposed between the low-pressure stage compressor 4 and the high-pressure stage compressor 5. Then, in the low-pressure stage compressor 4 and the high-pressure stage compressor 5, the bundles 42 and 52 can be removed from the compressor casings 41 and 51 by pulling out the bundles 42 and 52 in the direction of the axis O so as to separate from the steam turbine 3. For that reason, when the bundles 42 and 52 are taken out from the compressor casings 41 and 51, it is possible to prevent the steam turbine 3 from interfering with the work. For that reason, the maintainability of the low-pressure stage compressor 4 and the high-pressure stage compressor 5 can be improved. Moreover, since the steam turbine 3 does not interfere with the work, the space secured around the low-pressure stage compressor 4 and the high-pressure stage compressor 5 for maintenance can be reduced. Accordingly, the size of the ammonia plant synthesis gas compressor train 1 can be reduced.

Additionally, in the steam turbine 3, the pair of thrust bearings 34A and 34B supporting the turbine shaft 31 is disposed between the pair of journal bearings 33A and 33B in the direction of the axis O. By disposing the thrust bearings 34A and 34B inside the turbine casing 30 in the direction of the axis O with respect to the journal bearings 33A and 33B, the length of the turbine shaft 31 that protrude outward in the direction of the axis O with respect to the pair of journal bearings 33A and 33B can be shortened. For that reason, the dynamic characteristics (rotor dynamics) of the turbine shaft 31 can be improved.

Moreover, the thrust collars 31c and 31d provided on the turbine shaft 31 have a large weight and a large rotary mass. By disposing such thrust collars 31c and 31d between the pair of journal bearings 33A and 33B, the rotary mass (inertial weight) located outside the pair of journal bearings 33A and 33B in the direction of the axis O can be suppressed. Therefore, the dynamic characteristics (rotor dynamics) of the turbine shaft 31 can be further improved.

Other Embodiments

As described above, the embodiment of the present disclosure has been described in detail with reference to the drawings. However, the specific configuration is not limited to the embodiment, and also includes design changes and the like without departing from the scope of the present disclosure.

In addition, in the above embodiment, the impellers 45 and 55 in both the low-pressure stage compressor 4 and the high-pressure stage compressor 5 satisfy the above Conditions 1 to 3. However, the present invention is not limited to such a structure. For example, in any one of the low-pressure stage compressor 4 and the high-pressure stage compressor 5, the impeller 45 or the impeller 55 may satisfy the above Conditions 1 to 3.

Additionally, in the above embodiment, the low-pressure stage compressor 4 and the high-pressure stage compressor 5 include the bundles 42 and 52. However, the present invention is not limited to such a structure. For example, both or one of the low-pressure stage compressor 4 and the high-pressure stage compressor 5 may be configured without the bundles 42 and 52. Additionally, the detailed structures of the low-pressure stage compressor 4 and the high-pressure stage compressor 5 including the bundles 42 and 52 are not limited in any way, and other structures can be appropriately adopted.

Additionally, in the above embodiment, the low-pressure stage compressor 4 and the high-pressure stage compressor 5 have the compressor casings 41 and 51 that are dividable into upper and lower parts. However, the structure of the compressor casings 41 and 51 is not limited to such a structure. The compressor casings 41 and 51 may have an integral tubular structure that is undividable into upper and lower parts. By making the compressor casings 41 and 51 undividable into upper and lower parts, the compressor casings 41 and 51 can withstand higher pressure. As a result, the pressures inside the gas flow channels 47 and 57 can be kept higher. For that reason, the discharge pressures of the synthesis gas G from the low-pressure stage compressor 4 and the high-pressure stage compressor 5 can be set higher.

Additionally, in the above embodiment, in the steam turbine 3, the pair of thrust bearings 34A and 34B is disposed between the pair of journal bearings 33A and 33B. However, the present invention is not limited to this. The pair of thrust bearings 34A and 34B may be configured to be provided outside the pair of journal bearings 33A and 33B in the direction of the axis O. Additionally, a configuration including only one of the pair of thrust bearings 34A and 34B may be adopted.

Additionally, the pair of thrust bearings 34A and 34B and the pair of journal bearings 33A and 33B are not limited to being disposed in the vicinity of both ends of the turbine shaft 31 as in the present embodiment. The pair of thrust bearings 3A and 34B and the pair of journal bearings 33A and 33B may be disposed at positions capable of supporting the turbine shaft 31.

<Appendix>

The ammonia plant synthesis gas compressor train 1 described in the embodiment is understood as follows, for example.

(1) An ammonia plant synthesis gas compressor train 1 according to a first aspect includes a steam turbine 3; and compression units 40 and 50 that are configured to compress a synthesis gas G by being rotationally driven by the steam turbine 3. The compression units 40 and 50 include rotary shafts 44 and 54 that are configured to rotate around an axis O, and a plurality of impellers 45 and 55 that are disposed on the rotary shafts 44 and 54 at intervals in a direction of the axis O and are r configured to rotate integrally with the rotary shafts 44 and 54 to pump a gas outward in a radial direction to compress the gas. In at least one of the plurality of impellers 45 and 55, a maximum operating peripheral speed at a radially outermost position of each of the plurality of impellers 45 and 55 is within a range of 290 m/s to 390 m/s, a yield strength is 827 MPa or less, and a Brinell hardness is 311 or less.

According to such a configuration, by setting the maximum operating peripheral speeds of the impellers 45 and 55 to 290 to 390 m/s, the rotational speeds of the compression unit 40 and 50 can be increased, and higher performances of the compression units 40 and 50 can be achieved. When the peripheral speeds of the impellers 45 and 55 are increased, the stresses acting on the impellers 45 and 55 may be increased. However, at least one of the impellers 45 and 55 has a yield strength of 827 MPa or less and a hardness of 311 or less. For that reason, hydrogen embrittlement of the impellers 45 and 55 can be suppressed while ensuring the strengths of the impellers 45 and 55. Therefore, it is possible to suppress the hydrogen embrittlement that occurs in the impellers 45 and 55 while increasing the rotational speeds of the impellers 45 and 55.

(2) The ammonia plant synthesis gas compressor train 1 according to a second aspect may be the ammonia plant synthesis gas compressor train 1 of (1) in which maximum rotational speeds of the compression units 40 and 50 are within a range of 12,000 rpm to 16,000 rpm.

According to such a configuration, Additionally, by setting the maximum rotational speeds of the compression units 40 and 50 that compress the synthesis gas G to a high rotational speed of 12,000 to 16,000 rpm, higher performances of the compression units 40 and 50 are can be achieved.

(3) The ammonia plant synthesis gas compressor train 1 according to a third aspect may be the ammonia plant synthesis gas compressor train 1 of (1) or (2) further including a low-pressure stage compressor 4 driven by the steam turbine 3; and a high-pressure stage compressor 5 driven by the steam turbine 3 at least one of the low-pressure stage compressor 4 and the high-pressure stage compressor 5 is the compression unit.

According to such a configuration, in at least one of the low-pressure stage compressor 4 and the high-pressure stage compressor 5, it is possible to suppress the hydrogen embrittlement that occurs in the impellers 45 and 55 while increasing the rotational speeds of the impellers 45 and 55.

(4) The ammonia plant synthesis gas compressor train 1 according to a fourth aspect may be the ammonia plant synthesis gas compressor train 1 of (3) in which the steam turbine 3 is disposed between the low-pressure stage compressor 4 and the high-pressure stage compressor 5, each the low-pressure stage compressor 4 and the high-pressure stage compressor 5 includes compressor casing 41 and 51, and bundles 42 and 52 that have the rotary shafts 44 and 54 and the plurality of the impellers 45 and 55 and are housed in the compressor casings 41 and 51, the bundles 42 and 52 are attachable to and detachable from the compressor casings 41 and 51 in a state where the rotary shafts 44 and 54 and the plurality of impellers 45 and 55 are held.

According to such a configuration, the low-pressure stage compressor 4 and the high-pressure stage compressor 5 include the bundles 42 and 52. For that reason, the discharge pressures of the synthesis gas G from the low-pressure stage compressor 4 and the high-pressure stage compressor 5 can be set high.

(5) The ammonia plant synthesis gas compressor train 1 according to a fifth aspect may be the ammonia plant synthesis gas compressor train 1 according to any one of (1) to (4) in which the steam turbine 3 includes a turbine shaft 31 that is configured to rotate around the axis O, a pair of journal bearings 33A and 33B that supports the turbine shaft 31 to be rotatable around the axis O, and a pair of thrust bearings 34A and 34B that is disposed between the pair of journal bearings 33A and 33B and supports the turbine shaft 31 in the direction of the axis O.

According to such a configuration, by disposing the thrust bearings 34A and 34B inside the journal bearings 33A and 33B in the direction of the axis O, the length of the turbine shaft 31 disposed outside the pair of journal bearings 33A and 33B in the direction of the axis O can be shortened. Additionally, the thrust collars 31c and 31d having a large weight and a large rotary mass are disposed between the pair of journal bearings 33A and 33B. Therefore, it is possible to suppress the rotary mass located outside the pair of journal bearings 33A and 33B in the direction of the axis O. As a result, the dynamic characteristics (rotor dynamics) of the turbine shaft 31 can be improved.

EXPLANATION OF REFERENCES

1 ammonia plant synthesis gas compressor train
2 compression unit
3 steam turbine
4 low-pressure stage compressor
5 high-pressure stage compressor
30 turbine casing
31 turbine shaft
31c, 31d thrust collar
33A, 33B journal bearing
34A, 34B thrust bearing
34p, 34q bearing pad
41,51 compressor casing
41a, 51a lower casing
41b, 51b upper casing
41c, 51c opening
42, 52 bundle
44, 54 rotary shaft
45, 55 impeller
45a, 55a disk
45b, 55b blade
45c, 55c cover
45e, 55e leading edge
46, 56 partition plate
47, 57 gas flow channel
48A, 48B, 58A, 58B bearing part
40 low-pressure stage compression unit (compression unit)
50 high-pressure stage compression unit (compression unit)
G synthesis gas
O axis
t wall thickness

What is claimed is:

1. An ammonia plant synthesis gas compressor train comprising:
 a steam turbine;
 a low-pressure stage compressor driven by the steam turbine and configured to compress a synthesis gas containing hydrogen; and
 a high-pressure stage compressor driven by the steam turbine and configured to compress the synthesis gas compressed by the low-pressure stage compressor,
 wherein the low-pressure stage compressor and the high-pressure stage compressor are compression units, wherein each of the compression units is configured to compress the synthesis gas by being rotationally driven by the steam turbine, wherein each of the compression units includes:
- a rotary shaft that is configured to rotate around an axis, and
- a plurality of impellers that are disposed on the rotary shaft at intervals in a direction of the axis and are configured to rotate integrally with the rotary shaft to pump a gas outward in a radial direction to compress the gas, wherein, in all of the plurality of impellers of the low-pressure stage compressor and the high-pressure stage compressor,
- a maximum operating peripheral speed at a radially outermost position of each of the plurality of impellers is within a range of 290 m/s to 390 m/s,
- a yield strength is 827 MPa or less,
- a Brinell hardness is 311 HB or less, and
- a material to form is nickel-chromium-molybdenum steel, wherein a maximum rotational speed of the low-pressure stage compressor and the high-pressure stage compressor are within a range of 12,000 rpm to 16,000 rpm, wherein the synthesis gas is a gas in which a partial pressure of hydrogen exceeds 689 kPa or a hydrogen concentration at any pressure exceeds 90 mol%, wherein the steam turbine is disposed between the low-pressure stage compressor and the high-pressure stage compressor, wherein each of the low-pressure stage compressor and the high-pressure stage compressor includes:
- a compressor casing; and
- a bundle that has the rotary shaft and the plurality of impellers and is housed in the compressor casing, wherein the bundle is attachable to and detachable from the compressor casing in a state where the rotary shaft and the plurality of impellers are held, and wherein the bundles of the low-pressure stage compressor and the high-pressure stage compressor are each configured to move in the direction of the axis so as to be separated from the steam turbine.

2. The ammonia plant synthesis gas compressor train according to claim 1,
wherein the steam turbine includes:
- a turbine shaft that is configured to rotate around an axis,
- a pair of journal bearings that supports the turbine shaft to be rotatable around the axis, and
- a pair of thrust bearings that is disposed between the pair of journal bearings and supports the turbine shaft in the direction of the axis.

* * * * *